A. LAMBERTON.

TWO-HIGH REVERSING ROLLING MILL AND LIKE MACHINE.

APPLICATION FILED JUNE 15, 1915.

Reissued Jan. 25, 1916.

14,053.

4 SHEETS—SHEET 1.

WITNESSES

J. Hobart Bradley

Thos. B. Hayes.

INVENTOR

Andrew Lamberton by Damon S. Wolcott

Atty

A. LAMBERTON.

TWO-HIGH REVERSING ROLLING MILL AND LIKE MACHINE.

APPLICATION FILED JUNE 15, 1915.

Reissued Jan. 25, 1916.

14,053.

4 SHEETS—SHEET 2.

WITNESSES

J. Herbert Bradley

Thos. B. Guy Jr.

INVENTOR

Andrew Lamberton by Dennis S. Wolcott

Atty

A. LAMBERTON.

TWO-HIGH REVERSING ROLLING MILL AND LIKE MACHINE.

APPLICATION FILED JUNE 15, 1915.

Reissued Jan. 25, 1916.

14,053.

4 SHEETS—SHEET 3.

WITNESSES

J. Herbert Bradley

Thos. B. Sayre.

INVENTOR

Andrew Lamberton by Dannie B. Wolcott

Atty

A. LAMBERTON.

TWO-HIGH REVERSING ROLLING MILL AND LIKE MACHINE.

APPLICATION FILED JUNE 15, 1915.

Reissued Jan. 25, 1916.

14,053.

4 SHEETS—SHEET 4.

WITNESSES

J. Herbert Bradley

Thos. B. Jeyes.

INVENTOR

Andrew Lamberton by Dennis S. Wolcott

Atty

UNITED STATES PATENT OFFICE.

ANDREW LAMBERTON, OF COATBRIDGE, SCOTLAND.

TWO-HIGH REVERSING ROLLING-MILL AND LIKE MACHINE.

14,053. Specification of Reissued Letters Patent. Reissued Jan. 25, 1916.

Original No. 1,024,475, dated April 23, 1912, Serial No. 657,318. Application for reissue filed June 15, 1915. Serial No. 34,315.

*To all whom it may concern:*

Be it known that I, ANDREW LAMBERTON, a subject of the King of Great Britain and Ireland, and a resident of Coatbridge, Scotland, have invented certain new and useful Improvements in Two-High Reversing Rolling-Mills and like Machines, of which the following is a specification.

The invention relates to that type of two-high reversing rolling mill in which to avoid reversal of the direction of rotation of the rolls they, constantly driven in one direction, are carried in housings which are capable of oscillation through 180 degrees by means of rack and pinion gearing in gable-like end frames (that is, substantial vertical framings in which are bearings for the housings) so as to reverse the relative positions of the rolls.

The invention has for its object to provide a simple and effective form of driving gear for such a mill.

In carrying out the invention, the two rolls in a vertical plane one above the other are connected by shafts with universal couplings to two shafts parallel with the rolls, but preferably in a horizontal plane and geared together so as to rotate reversely.

Alternatively and in cases where the draft is practically invariable, the rolls may be directly geared together and one be driven through a shaft and universal couplings from a driving shaft arranged in a position mean to the two alternative positions of the roll so driven.

Figure 1:
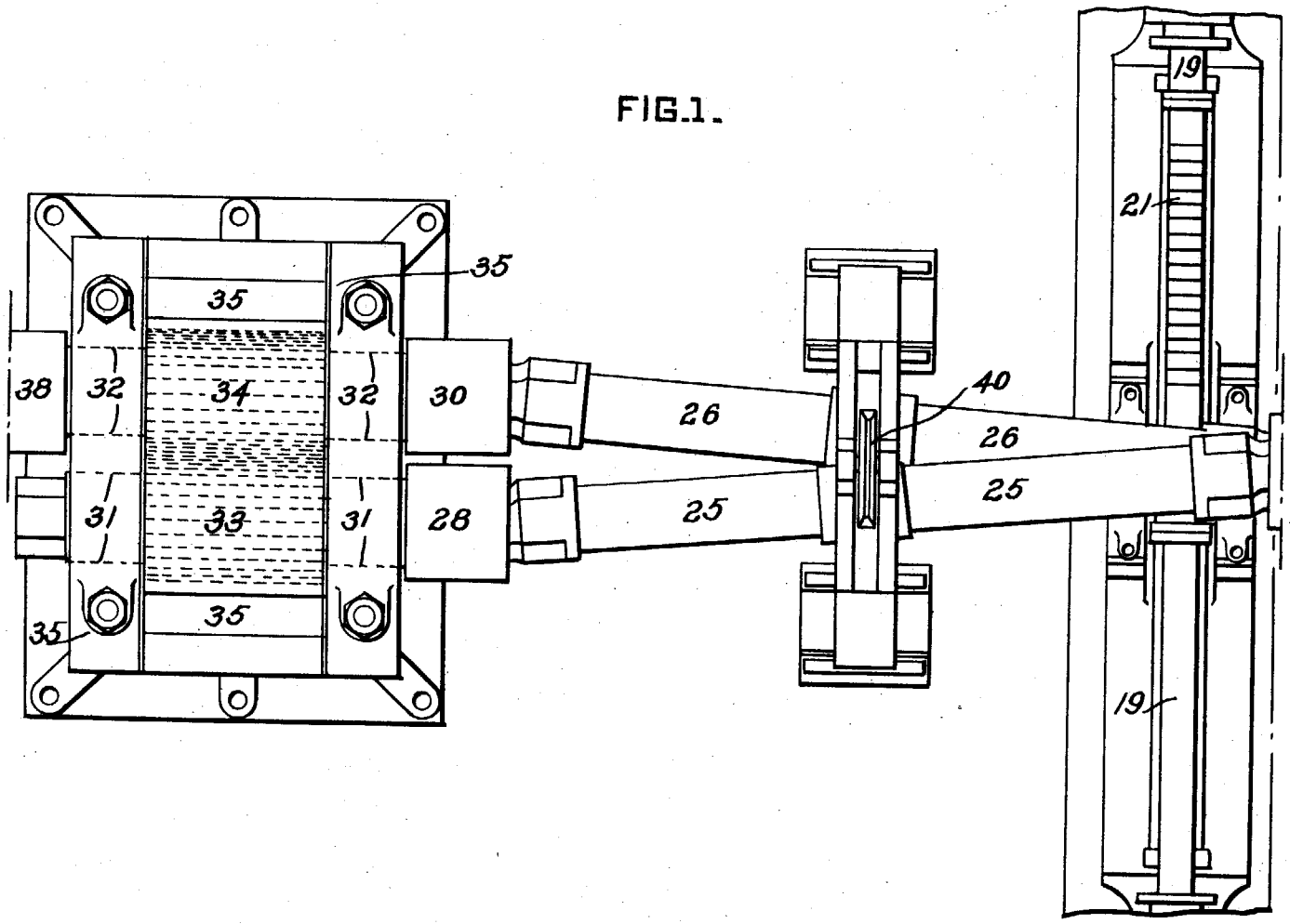
Figure 2:
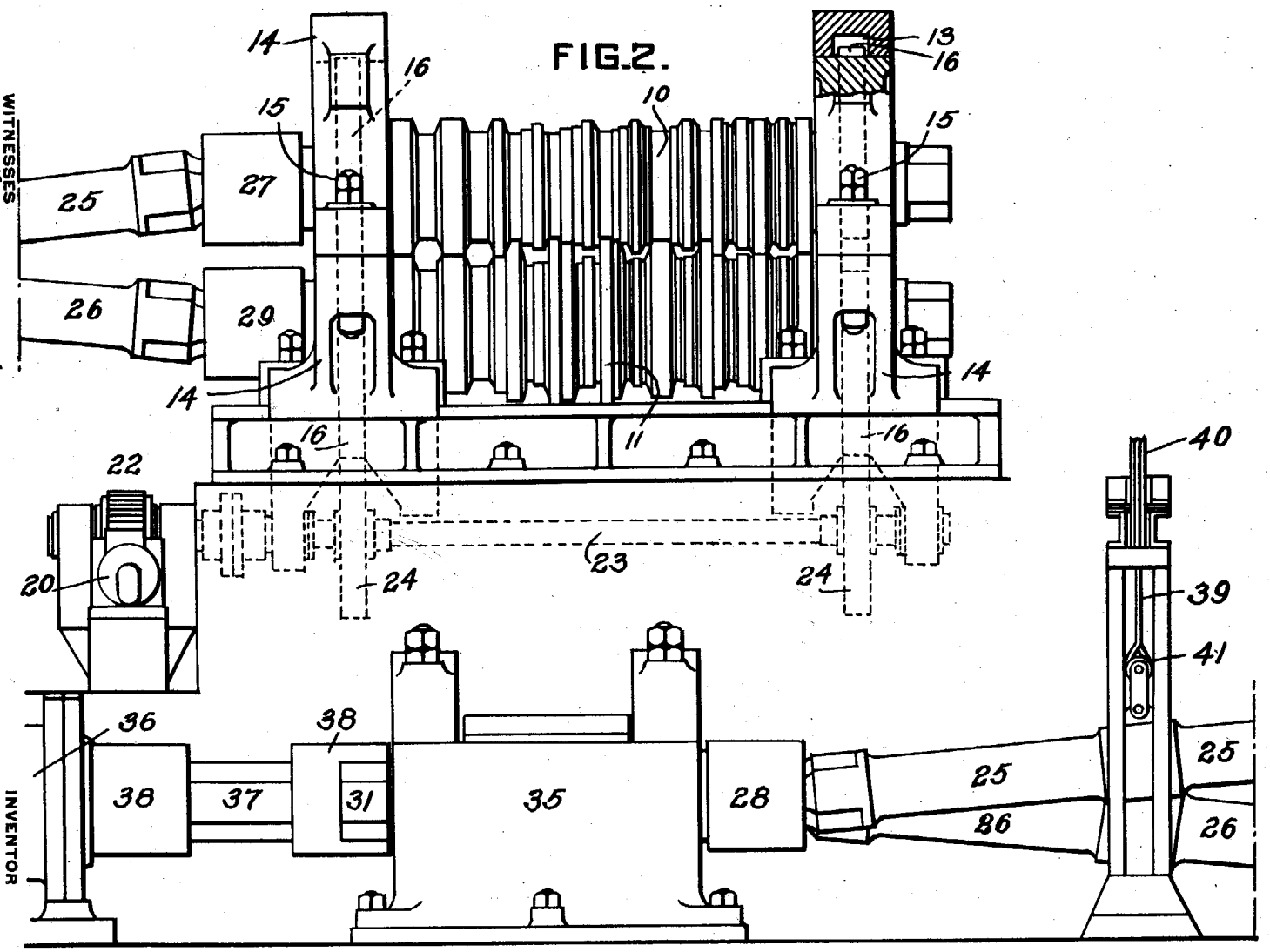
Figure 3:
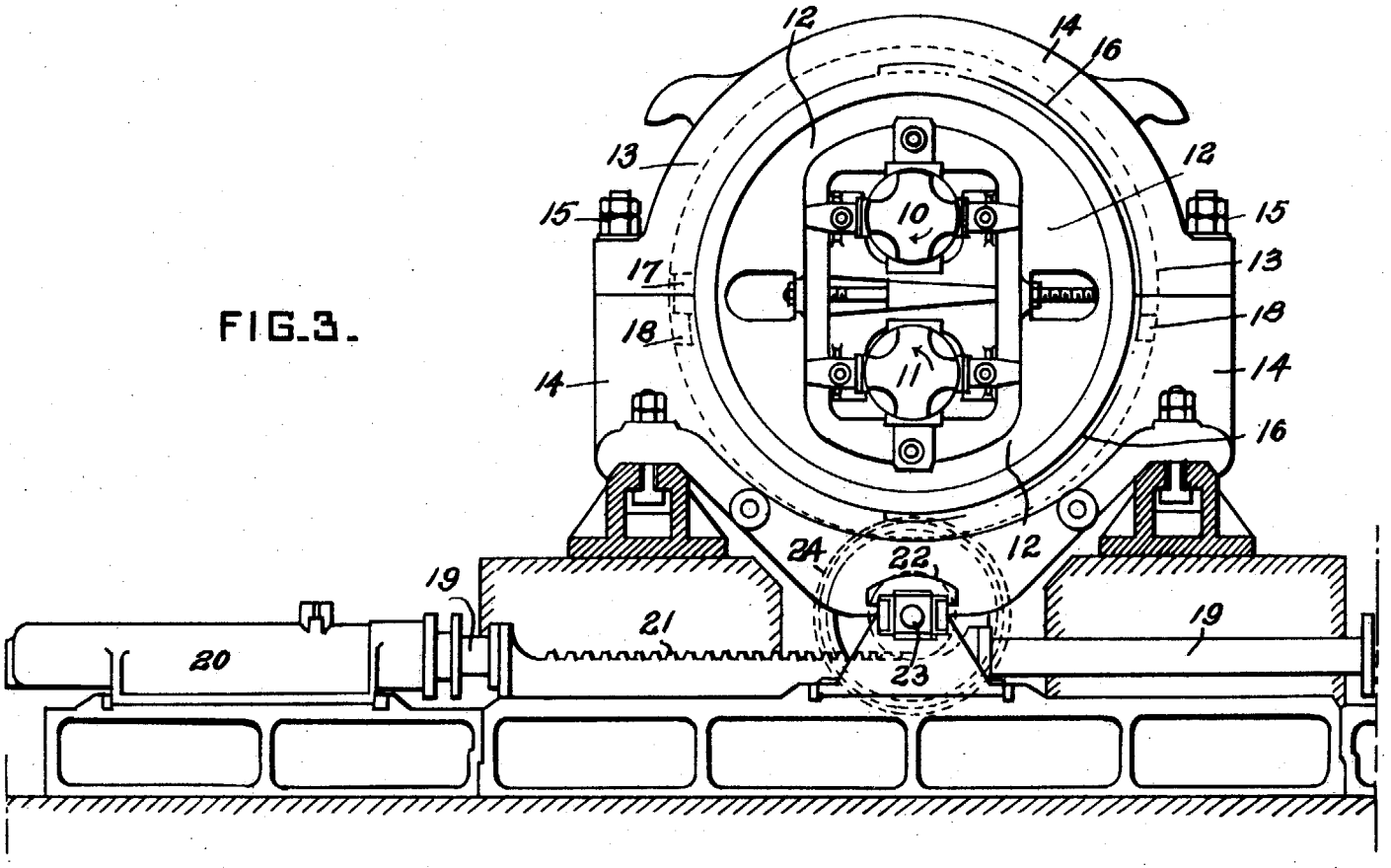
Figure 4:
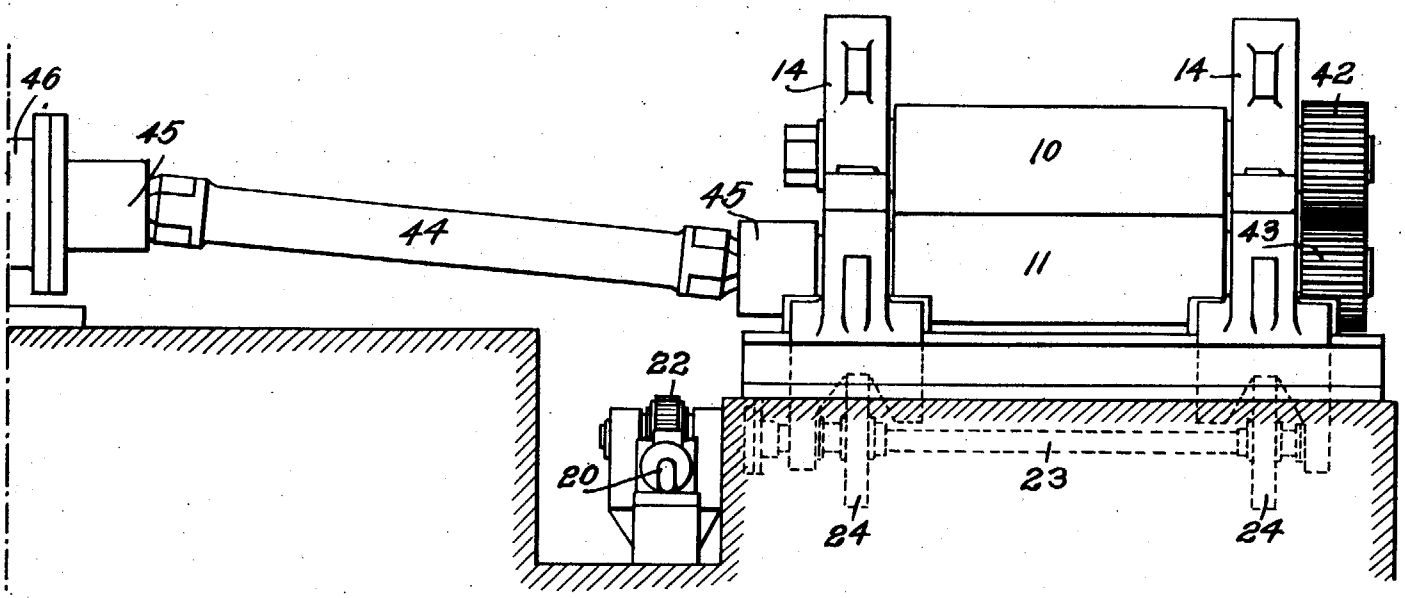

In order that the invention and the manner of performing the same may be properly understood there are hereunto appended explanatory drawings illustrative of the carrying out of the invention, Figure 1 being a plan view of the mill operating mechanism; and Fig. 2 a subdivided side elevation; and Fig. 3 an end elevation of a mill of the type referred to provided with an example of the improved form of driving gear; while Fig. 4 is a side elevation of an alternative form of the gear.

In the illustrative example shown in Figs. 1 to 3 and which is of a rail-mill, the pair of rolls 10, 11 (arranged as usual one vertically above the other) are carried in housings 12. The peripheries of these housings are circular and engage counterpart circular tracks 13 in stationary gables 14 made in halves and secured about the housings by king bolts 15. Between the engaging tracks 13 in the gables are gaps to accommodate arcs 16 of teeth, while projections 17 on the housings entering these gaps engage stops 18 in the gaps, so limiting the travel of the housings within the gables to 180 degrees. The housings are rotated within the gables this prescribed amount by means of hydraulic rams 19 operating within cylinders 20 and carrying a toothed rack 21 which gears with a pinion 22 on a shaft 23 which has on it pinions 24 gearing with the arcs 16. This whole arrangement of rotary housings and stationary gables is of known form, but its explanation is necessary to the description of the invention.

The improved gearing is as follows:—The rolls 10, 11 are driven by shafts 25, 26 through universal coupling devices 27, 28, 29, 30 from two gear shafts 31, 32 parallel with the roll axes but in a horizontal plane the level of which is about midway between the rolls. On the two shafts 31, 32 are intermeshing pinions 33, 34, the whole being arranged in a gear box 35. One pinion shaft 32 is driven from a first motion shaft 36 through a usual short shaft 37 and universal couplings 38. In order that the weight of the shafts 25, 26 may not have to be overcome in turning the housings through the prescribed 180 degrees, they are interconnected with one another by a chain 39 passing over a pulley 40 and connected to stirrups 41 embracing them, so that they thus mutually balance one another. Alternatively and as shown in Fig. 4, the rolls 10, 11 may be directly geared together by pinions 42, 43 and one be driven through a shaft 44 and universal couplings 45 from a driving shaft 46 arranged in a position mean to the two alterative positions of the roll so driven.

As explanatory of the action, let it be considered that the upper roll 10 of the pair of rolls 10, 11 when the housings 12 are in one position, is rotating clockwise, passes are made from right to left as the lower and which is now the engaging surface of that roll is traveling from right to left. The housings are now rotated through 180 degrees, the upper roll 10 has become the lower. It still rotates clockwise but it is now its upper surface which is in engagement. Its upper surface moves from left to right. The pass is now from left to right—that is, in opposite direction and that with the rolls running continuously in the same direction as before but with their relative positions reversed.

I claim as my invention:—

1. In a two-high reversing rolling-mill of the type having housings carrying the pair of rolls normally in a vertical plane, gables carrying the housings, and means for rotating the housings within the gables through 180 degrees; means for driving the rolls comprising a gear shaft parallel with the roll axes coupled to one thereof and lying in a horizontal plane intermediate the horizontal planes of the roll axes, a driving shaft for said gear shaft and universal couplings between said driving and gear shafts.

2. In a two-high reversing rolling-mill of the type having housings carrying the pair of rolls normally in a vertical plane, gables carrying the housings, and means for rotating the housings within the gables through 180 degrees; means for driving the rolls comprising a gear shaft parallel with the roll axes coupled to one thereof and lying in a horizontal plane intermediate the horizontal planes of the roll axes, a second similarly arranged gear shaft coupled to the said second roll, means for driving said gear shafts and universal couplings between said gear shafts and said means.

3. In a two-high reversing rolling mill of the type having housings carrying the pair of rolls normally in a vertical plane, gables carrying the housings, and means for rotating the housings within the gables through 180 degrees; means for driving the rolls comprising a gear shaft parallel with the roll axes coupled to one thereof and lying in a horizontal plane intermediate the horizontal planes of the roll axes, a second similarly arranged gear shaft coupled to the second roll, the pinions on said gear shafts intermeshing, a driving shaft and universal couplings between said driving shaft and one gear shaft.

4. In a two-high reversing rolling-mill of the type having housings carrying the pair of rolls normally in a vertical plane, gables carrying the housings, and means for rotating the housings within the gables through 180 degrees; means for driving the rolls comprising a gear shaft parallel with the roll axes and lying in a horizontal plane intermediate the horizontal planes of the roll axes, a second similarly arranged gear shaft, means for driving said gear shafts, universal couplings between said gear shafts and said means, a transmission shaft between each gear shaft and its corresponding roll, and a counterbalancing device between said transmission shafts comprising a flexible member connected to said shafts and a pulley mounted over the shafts and over which said flexible member passes.

5. In a two-high reversing rolling-mill, a pair of shaping rolls, means for rotating the same around a common axis to reverse their relative positions for the purpose described, in combination with a gear shaft lying in a horizontal plane intermediate the horizontal planes of said roll axes in working position, an intermediate transmission member and universal couplings connecting the latter at one end to said gear shaft and at the other end to one of said shaping rolls.

6. In a two-high reversing rolling-mill of the type having housings carrying the pair of rolls normally in a vertical plane, gables carrying the housings, means for rotating the housings through an arc of 180 degrees, and means for driving the rolls comprising a shaft parallel with the roll axes and having its axis in a horizontal plane intermediate the horizontal planes of the roll axes, said shaft being coupled to one of the rolls, and means for rotating said shaft.

7. In a two-high reversing rolling mill of the type having housings carrying the pair of rolls normally in a vertical plane, gables carrying the housings, means for rotating the housings through an arc of 180 degrees, and means for driving the rolls comprising shafts parallel with the roll axes and lying in a horizontal plane intermediate the horizontal planes of the rolls, and coupled to said rolls, and means for rotating said shafts and rolls in opposite directions.

8. In a two-high reversing rolling mill of the type having housings carrying the pair of rolls normally in a vertical plane, gables carrying the housings, means for rotating the housings through an arc of 180 degrees, means for driving the rolls comprising shafts parallel with the roll axes and lying in a horizontal plane intermediate the horizontal planes of the rolls and coupled to said rolls, means for rotating one of said shafts, and means operated by the latter for rotating the other shaft in the opposite direction.

9. In a two-high reversing rolling mill of the type having housings carrying the pair of rolls normally in a vertical plane, gables carrying the housings, means for rotating the housings through an arc of 180 degrees, means for driving the rolls comprising shafts parallel with the roll axes and lying in a horizontal plane intermediate the horizontal planes of the rolls, transmitting shafts having their respective ends connected by universal members to the rolls and the parallel shafts, and means interposed between the transmitting shafts whereby one shaft serves as a counter-balance for the other shaft.

10. In a two-high reversing rolling mill of the type having housings carrying the pair of rolls normally in a vertical plane, gables carrying the housings, means for rotating the housings through an arc of 180 degrees, means for driving the rolls comprising shafts parallel with the roll axes and lying in a horizontal plane intermediate the horizontal planes of the rolls, transmitting shafts having their respective ends connected by universal members to the rolls and the parallel shafts and a counterbalancing device comprising a flexible member passing over a pulley and having its ends connected to the transmitting shafts.

11. In a two-high reversing rolling mill, a pair of rolls, means for rotating the rolls around a common axis to reverse their relative positions, in combination with a rotating member lying in a horizontal plane intermediate the horizontal planes of the roll axes in working position, and a transmitting shaft having its ends connected respectively with one of the rolls and with the rotating member.

12. In a rolling mill, the combination of a pair of rolls, means for so shifting said rolls that their axes are in relatively reversed positions in a vertical plane, thus reversing the direction of reduction by the rolls, in combination with a rotating member lying in a horizontal plane intermediate the horizontal planes of the axes of said rolls when in operative position, and an intermediate transmission member flexibly connected to one of the rolls and to the rotating member.

In testimony whereof I have signed my name to this specification in the presence of to subscribing witnesses.

ANDREW LAMBERTON.

Witnesses:
WILFRED HUNT,
BERTRAM HUNT.